United States Patent Office 3,222,362
Patented Dec. 7, 1965

3,222,362
ARYLAMINOALKYL CEPHALOSPORINS
Edwin H. Flynn, Indianapolis, Ind., assignor to Eli Lilly and Company, Indianapolis, Ind., a corporation of Indiana
No Drawing. Filed Aug. 23, 1961, Ser. No. 133,309
2 Claims. (Cl. 260—243)

This invention relates to novel organic compounds and to methods for their preparation.

The novel compounds of this invention are represented by the following structural formula:

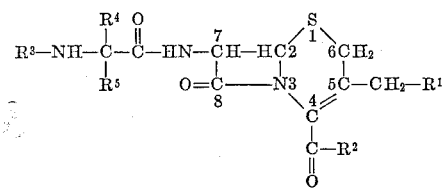

in which $R^1$, taken alone, is —OH, $C_1$–$C_8$ acyloxy, or tertiary-amino, $R^2$ is —OH when $R^1$ is —OH, $R^2$ is —OH when $R^1$ is $C_1$–$C_8$ acyloxy, $R^2$ is —O⁻ when $R^1$ is tertiary-amino, $R^1$ and $R^2$, when taken together, are —O—, $R^3$ is phenyl, naphthyl, or substitution products thereof, $R^4$ is hydrogen or methyl, and $R^5$ is hydrogen or methyl.

Thus, $R^1$ can be acetoxy, propionoxy, butyroxy, capryloxy, or the like; or N-pyridyl, N-pyrimidyl, trimethylamino, triethylamino, tributylamino, or other tertiary-amino group such as those produced by reaction of cephalosporin C with nicotine, nicotinic acid, isonicotinic acid, nicotinamide, 2-aminopyridine, 2-amino-6-methylpyridine, 2,4,6 - trimethylpyridine, 2 - hydroxymethylpyridine, sulfapyridine, 3-hydroxypyridine, pyridine-2,3-dicarboxylic acid, quinoline, sulfadiazine, sulfathiazole, picolinic acid, and the like.

$R^3$ can be phenyl, α-naphthyl, or β-naphthyl, or substitution products thereof, having one or more chlorine, bromine, fluorine, iodine, nitro, trifluoromethyl, $C_1$–$C_4$ alkyl, or $C_1$–$C_2$ alkoxy substituents on the ring or rings.

The novel compounds of the present invention are related to cephalosporin C insofar as they contain the 5,6-dihydro-2H-1,3-thiazine ring with a fused β-lactam ring in the 2,3 position which is characteristic of cephalosporin C. However, unlike cephalosporin C, which contains the 5'-amino-N'-adipamyl group in the 7 position, the compounds of the present invention are characterized by an arylaminoalkyl group in the 7 position. Moreover, unlike cephalosporin C, which has a relatively low antibacterial action, the compounds of the present invention are highly effective antibacterial agents, capable of inhibiting the growth of numerous types of microorganisms in a variety of environments.

As will be observed from the formulas given above, the invention includes a variety of related compounds having the bicyclic ring structure of cephalosporin C, but with variations in the substituent groups attached thereto. Among such compounds are those having the nuclei of the cephalosporin-type products known as cephalosporin $C_c$, desacetylcephalosporin C, and cephalosporin $C_A$, these nuclei being represented by the following formulas, respectively:

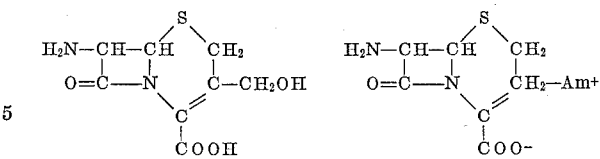

where Am represents a tertiary-amino radical, exemplified above. As will be seen from the above formulas, the nucleus of cephalosporin $C_c$ includes a fused lactone ring, while the nucleus of cephalosporin $C_A$ forms an inner salt or zwitterion.

As is the case with the penicillins, to which the compounds of this invention are in some degree related, numerous salts esters, amides and like derivatives thereof can be prepared by combination with nontoxic pharmaceutically acceptable cations, anions, alcohol residues, ammonia, and amines, and such derivatives are to be regarded as the full equivalents of the compounds disclosed and claimed herein, and accordingly are to be considered as within the scope of this invention.

For purpose of illustration, there can be mentioned several types of cationic salts which can be prepared from compounds containing the cephalosporin C nucleus, including, for example, water-soluble salts such as the sodium, potassium, lithium, ammonium, and substituted ammonium salts, as well as the less water-soluble salts such as the calcium, barium, procaine, quinine, and dibenzylethylenediamine salts. Those compounds which contain the cephalosporin $C_A$ nucleus do not form cationic salts but instead form anionic salts, i.e., acid addition salts, with strong acids such as hydrochloric, hydrobromic, phosphoric, sulfuric, and like acids.

The following examples, together with the operating example appearing hereinafter, will illustrate the types of compounds available in accordance with the present invention:

7-anilinoacetamidocephalosporanic acid
7-α-anilinopropionamidocephalosporanic acid
7-α-anilino-α-methylpropionamidocephalosporanic acid
7-o-chloroanilinoacetamidocephalosporanic acid
7-p-bromoanilinoacetamidocephalosporanic acid
7-o-fluoroanilinoacetamidocephalosporanic acid
7-α-naphthylaminoacetamidocephalosporanic acid
7-β-naphthylaminoacetamidocephalosporanic acid
7-α-(α'-naphthylamino)propionamidocephalosporanic acid
7-α-(β'-naphthylamino)-α-methylpropionamidocephalosporanic acid
7-(1'-chloro-2'-naphthylamino)acetamidocephalosporanic acid
7-p-trifluoromethylanilinoacetamidocephalosporanic acid
7-o-tolylaminoacetamidocephalosporanic acid
7-(4'-nitro-1'-naphthylamino)acetamidocephalosporanic acid
7-p-isopropylanilinoacetamidocephalosporanic acid
7-o-methoxyanilinoacetamidocephalosporanic acid and the like, including the cephalosporin $C_A$ and cephalosporin $C_c$ analogues thereof.

Cephalosporin C can be prepared by cultivating a cephalosporin C-producing organism in a suitable nutrient medium, as described in British patent specification 810,-196, published March 11, 1959.

Cephalosporin C is readily converted into cephalosporin $C_c$ by heating with water under acid conditions, as described in Belgian Patent 593,777, published November 30, 1960. This removes the acetyl group from

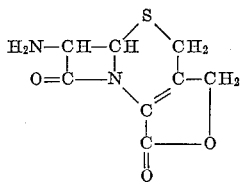

its point of attachment through oxygen to the methyl group in the 5 position of the thiazine ring, and lactonization then spontaneously occurs, yielding the fused cyclic lactone.

Cephalosporin C is also readily converted into compounds of the cephalosporin $C_A$ type by refluxing in aqueous solution with an excess of pyridine, for example, as described in Belgian Patent 593,777. The reaction is applicable in general to the tertiary amines, of which numerous examples are given above, yielding corresponding derivatives of the cephalosporin $C_A$ type wherein the tertiary amine is attached to the methyl group in the 5 position of the thiazine ring, and forms an inner salt with the carboxyl group in the 4 position.

Desacetylcephalosporin C is conveniently prepared by treating cephalosporin C with citrus acetylesterase for several hours in aqueous phosphate buffer at pH 6.5–7 according to the method of Jansen, Jang, and MacDonnell, Archiv. Biochem., 15 (1947), 415–31.

From the various cephalosporin C compounds thus available, the corresponding nucleus is readily obtained by cleaving the 5'-amino-N'-adipamyl side chain between its amido nitrogen and its amido carbonyl group. Thus, 7-aminocephalosporanic acid can be obtained by digesting cephalosporin C for an extended period in the presence of a mineral acid and in the absence of light, according to the method described in Belgian Patent 593,777.

The compounds of the present invention are prepared by acylation of the appropriate cephalosporin C nucleus, be it the nucleus of cephalosporin C itself or of cephalosporin $C_c$, or cephalosporin $C_A$, or other variant. Alternatively, compounds of the cephalosporin $C_c$, $C_A$, and desacetylcephalosporin C classes can be obtained by applying to appropriate 7-acylamidocephalosporanic acids the conversion procedures of Belgian Patent 593,777 and of Jansen et al. to produce compounds having the respective nuclei.

For the acylation of the 7-amino group of the cephalosporin nucleus, as defined above, any of the conventional acylation procedures can be employed, utilizing any of the various types of known acylating agents having a composition which yields the desired side chain.

A convenient acylating agent is the appropriate arylaminoacyl chloride or bromide. The acylation is carried out in water or an appropriate organic solvent, preferably under substantially neutral conditions, and preferably at reduced temperature, i.e., above the freezing point of the reaction mixture and up to about 20° C. In a typical procedure, 7-aminocephalosporanic acid or one of its derivatives as defined herein, together with a sufficient quantity of sodium bicarbonate or other appropriate alkali to promote solution, is dissolved in aqueous 50 volume-percent acetone, the concentration of the 7-aminocephalosporanic acid being about 1 to about 4 percent by weight. The solution is cooled to around 0 to 5° C., and a solution of the acylating agent is added in about 20 percent excess, with stirring and cooling. The pH of the mixture can be maintained, if it tends to vary, around the neutral level by bubbling carbon dioxide therein. After addition of the acylating agent has been completed, stirring of the reaction mixture is continued, and the mixture is allowed to warm to room temperature. The reaction product is then acidified to around pH 2 and extracted with an organic solvent such as ethyl acetate. The ethyl acetate extract is adjusted to around pH 5.5 with a base containing the desired cation of the final product, and is extracted with water. The water solution is separated and evaporated to dryness. The residue is taken up in the minimum quantity of water, and the desired product is precipitated by adding a large excess of acetone and, if necessary, ether. The crystalline product obtained thereby is filtered, washed with acetone, and dried.

Acylation can also be carried out with the corresponding arylaminoalkanoic acid, employed in conjunction with an equimolar proportion of a carbodiimide such as N,N'-diisopropylcarbodiimide, N,N'-dicyclohexylcarbodiimide, N,N'-bis(p-dimethylaminophenyl)carbodiimide, N-ethyl-N'-(4''-ethylmorpholinyl)carbodiimide, or the like, and the acylation proceeds at ordinary temperatures in such cases.

Alternatively, the arylaminoalkanoic acid can be converted into the corresponding acid anhydride, or into the azide, or into an activated ester, and any of those derivatives can be used to effect the desired acylation. Other agents can readily be ascertained from the art.

In many cases, the acylating agent may contain one or more asymmetric carbon atoms and thus exist in optically active forms. When prepared by ordinary chemical means, such compounds are ordinarily obtained in racemic form—i.e., an equimolar mixture of the optical isomers, having no optical rotation. When the separate optical isomers are desired, the acylating agent can be resolved in a conventional manner such as by reacting the free acid with cinchonine, strychnine, brucine, or the like, then fractionally crystallizing to separate the diestereoisomeric salts, and separately acidifying the solid phase and the liquid phase to liberate the optical isomers. The free acids thus obtained can be employed as such for the acylation, preferably in conjunction with a carbodiimide, or may be converted by conventional means into the corresponding acid halide or into a mixed anhydride, care being exercised to avoid extremes of conditions which might produce racemization.

Many of the acylating agents, together with methods for their preparation, are described in the literature, and a number of them are commercially available. All of them are readily prepared by methods well known in the art.

The invention will be more readily understood from the following operating example, which is submitted as an illustration only, and not by way of limitation.

EXAMPLE

*7-p-nitroanilinoacetamidocephalosporanic acid*

7-aminocephalosporanic acid (1.4 g.) and sodium bicarbonate (800 mg.) were dissolved in a mixture of 50 ml. of water and 40 ml. of acetone. The resulting solution was cooled in an ice bath, and to it was added a solution of 800 mg. of p-nitroanilinoacetyl chloride in 10 ml. of acetone over a period of 45 minutes, after which stirring was continued for 1.5 additional hours.

The reaction product mixture was stripped of acetone under vacuum, layered with 50 ml. of ethyl acetate, and acidified to pH 2.0 with hydrochloric acid. The ethyl acetate layer was separated and back-extracted into water at pH 5.5, the pH adjustment being carried out with dilute aqueous potassium hydroxide solution. The aqueous extract was concentrated to a syrup and solidified by dilution. The resulting crude product was filtered off (weight, 800 mg.) and recrystallized from methanol. Purified 7-p-nitroanilinoacetamidocephalosporanic acid was obtained thereby in the form of the potassium salt, weighing 600 mg., having a $pK'_a$ of 4.80 in aqueous 66 percent dimethylformamide, and maxima in its ultraviolet absorption spectrum at 227 and 384 m$\mu$ ($\epsilon$=11,600 and 13,900, respectively) with a shoulder at 257 m$\mu$.

The product had an oral $ED_{50}$ of 16.1 mg./kg. against hemolytic streptococci in mice and an antibiotic potency of 425 penicillin G units per milligram, determined against *Staphylococcus aureus* 209 P by an appropriate modification of the paper disc plate methods of Higgens et al., Antibiotics & Chemotherapy, 3, 50–54 (January 1953) and Loo et al., Journal of Bacteriology, 50, 701–709 (1945). It was active against resistant staphylococci in the presence and in the absence of human blood serum.

I claim:
1. 7-p-nitroanilinoacetamidocephalosporanic acid.

2. An antibiotic substance of the class represented by the following formula:

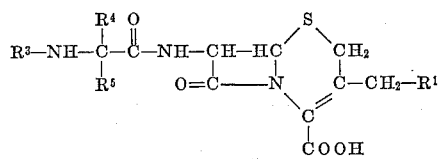

wherein
R¹ is a member of the class consisting of acetoxy, N-pyridyl, and N-pyridyl having at least one substituent, said substituent being selected from the class consisting of carboxy, carbamyl, amino, methyl, hydroxymethyl, and hydroxy;
R³ is a member of the class consisting of phenyl and naphthyl and the substitution products thereof having at least one substituent group, said substituent group being a member of the class consisting of halogen, nitro trifluoromethyl, $C_1$–$C_4$ alkyl, and $C_1$–$C_2$ alkoxy;
R⁴ is a member of the class consisting of hydrogen and methyl;
R⁵ is a member of the class consisting of hydrogen and methyl;
and the salts thereof with pharmaceutically acceptable cations and anions.

References Cited by the Examiner
UNITED STATES PATENTS
2,941,995  6/1960  Doyle et al. _____ 260—239.1
FOREIGN PATENTS
593,777  12/1960  Belgium.
OTHER REFERENCES
Burger: Medicinal Chemistry, page 46 (1960).
Wertheim: Textbook of Organic Chemistry, pages 763–764 (1945).

NICHOLAS S. RIZZO, *Primary Examiner.*